United States Patent [19]
Kanai

[11] Patent Number: 5,239,667
[45] Date of Patent: Aug. 24, 1993

[54] METHOD OF CONTROLLING HANDOFF IN CELLULAR MOBILE RADIO COMMUNICATIONS SYSTEM

[75] Inventor: Toshihito Kanai, Tokyo, Japan
[73] Assignee: NEC Corporation, Tokyo, Japan
[21] Appl. No.: 648,768
[22] Filed: Jan. 31, 1991

[30] Foreign Application Priority Data
Jan. 31, 1990 [JP]  Japan ................................ 2-20766
Jan. 31, 1990 [JP]  Japan ................................ 2-20767

[51] Int. Cl.$^5$ ............................................. H04Q 7/00
[52] U.S. Cl. ................... 455/10; 455/33.2; 455/34.2; 455/52.3; 455/67.4; 455/89; 455/226.2; 379/60
[58] Field of Search ............. 379/60; 455/9, 10, 33.2, 455/33.4, 34.1, 34.2, 52.3, 67.1, 67.4, 89, 115, 226.2, 226.4

[56] References Cited

U.S. PATENT DOCUMENTS

3,067,417 12/1962 Harding .
3,906,166 9/1975 Cooper et al. .................... 379/60
4,670,905 6/1987 Sandvos et al. ................... 379/60
4,696,027 9/1987 Bonta ............................ 455/33.2

OTHER PUBLICATIONS

Lee et al., Digital Communication, 1988, pp. 126–128.
Ralphs, et al., An h.f. Channel Simulator Using a New Raleigh Finding Method, Radio and Electronic Engineer Dec. 1976, pp. 579–587.

*Primary Examiner*—Reinhard J. Eisenzopf
*Assistant Examiner*—Timothy H. Keough
*Attorney, Agent, or Firm*—Sughrue, Mion, Zinn, Macpeak & Seas

[57] ABSTRACT

When communication is established using a mobile radio terminal, the speed at which the terminal is moving is measured by monitoring the Rayleigh fading of the signal strength. Using this velocity indicative parameter, a threshold level which is used to determine if a handoff is required or not, can be adjusted in a manner which renders the decision process more accurate and minimizes the number of unwarranted handoffs.

4 Claims, 4 Drawing Sheets

METHOD OF CONTROLLING HANDOFF IN CELLULAR MOBILE RADIO COMMUNICATIONS SYSTEM

BACKGROUND OF THE INVENTION

1. Field of the Invention

The present invention relates to a method of controlling handoff in a cellular mobile radio communications system, and more specifically to such an arrangement and method which features a high quality speech transmission even if each of the cells is subdivided into very small sub-cells.

2. Description of the Prior Art

It is known in the art to apply frequency reuse in a mobile radio communications system in order to satisfy various objectives such as large subscriber capacity, efficient spectrum use, widespread availability, adaptability to traffic density, etc.

Frequency reuse refers to the use of the same radio carrier frequency in a number of different channels to cover different areas which are separated from one another by distances sufficient that objectionable co-channel interference does not occur. A system utilizing such concept is known as a cellular land mobile radio system.

In order to meet the ever increasing number of subscribers, subdividing each of the cells into very small ones (sub-sections) has been proposed. If one cell is subdivided into a plurality of very small sub-sections each of which has one-tenth radius of the original one, the efficiency of frequency reuse can be increased 100 fold.

However, in such a microcellular mobile radio communications system, when a communicating mobile unit moves through a plurality of cells, undesirably frequent handoffs are inevitably encountered.

In a mobile radio communication system currently employed by NTT (Nippon Telegram and Telephone, Company), the handoff is exclusively controlled by a land site and/or a mobile telephone switching office (MTSO). However, as the number of handoffs increases, the land site and/or the MTSO requires more and more sophisticated controllers. The above-mentioned NTT system is described in a book entitled "automobile telephone system" published by Japanese Electronic Communications Association, on pages 197-200.

One approach to lessening such a burden on a land site and/or MTSO, has been proposed by Toshihito Kanai, et al in a technical research paper RC S89-37 entitled "An experimental digital cellular system for high speed handoff". This paper was published by Japanese Electronic Information & Communications Association on Oct. 25, 1989. According to this paper, a mobile unit compares an average value of received signal levels of control channels of the currently connected land site with those of a nearby land site or sites. In the event that the mobile unit detects the signal strength level of a control channel which is higher than that currently in use, the communication channel is switched over to the land site of the stronger channel. According to this proposal, the handoff control is transferred to each mobile unit and, therefore the problem inherent in the firstly mentioned prior art technique is overcome.

However, in the case where a mobile unit moves along or in the vicinity of a cell boundary, the frequency of handoffs increases to such an extent that the transmission processing capacity of each land sites, MTSOs and/or exchanges tends to be exceeded. Further, each of the handoffs causes an instantaneous transmission cut-off which degrades a transmission quality.

Accordingly, in order to lower the number of handoffs to a reasonable level, it is necessary to require that certain conditions be met before the handoff can be made. According to one known technique, either one of the mobile and land sites is arranged to be able to detect the difference between the received signal levels by subtracting the signal level of a currently used channel from the signal level of a control channel of a nearby land site. Only when the difference reaches a predetermined threshold level, a handoff is permitted and thus the frequency of handoffs can be attenuated. However, if the threshold level is set too low, the frequency of the handoffs is not reduced while on the other hand, if the threshold level is set too high, a mobile unit is not "handed off" to another cell even when it is necessary.

When a time duration for detecting an average signal level is constant, the measuring error increases with the decrease in moving speed of a mobile unit and vice versa. Therefore, the above-mentioned threshold level should be raised when the mobile unit moves slowly, and should be lowered in the case of a mobile unit is moving at a high speed. Accordingly, a high threshold level should be set to a hand-held mobile terminal, while a low threshold level to a vehicle mounted mobile terminal. However, in the case where a hand-held mobile terminal is used within a vehicle compartment or a train travelling at high speed, or in the case where a vehicle mounted mobile terminal is used during a traffic jam, the above-mentioned setting of the threshold levels is no longer able to reduce the undesirable frequency of the handoffs. As a consequence, the above-mentioned problems inherent in the prior art techniques are unable to be overcome.

In connection with a vehicle mounted mobile terminal, it is possible to vary the threshold level according to a vehicle speed detected. However, there is a practical difficulty that a vehicle should be modified to enable the vehicle speed data to be supplied to the mobile terminal. Furthermore, detecting the moving speed is impossible in the case of a hand-held mobile terminal.

SUMMARY OF THE INVENTION

It is an object of the present invention to provide a method of minimizing the number of unwarranted handoffs by changing a threshold level in accordance with a mobile terminal travelling speed.

In brief, the above object is achieved by a method wherein when communication is established using a mobile radio terminal, the speed at which the terminal is moving is measured by monitoring the Rayleigh fading of the signal strength. Using this velocity indicative parameter, a threshold level which is used to determine if a handoff is required or not, can be adjusted in a manner which renders the decision process more accurate and minimizes the number of unwarranted handoffs.

More specifically a first aspect of the present invention comes in a method of controlling handoff in a cellular mobile radio communications system at a mobile unit, comprising: (a) detecting a first signal strength level of a channel through which the mobile unit communicates with a land site, and further detecting a second signal strength level of a channel through which no communication is established between the mobile unit and a land site; (b) detecting a level crossing rate which is the number indicating that the first signal strength level crosses a given level within a predetermined time duration; (c) detecting a signal strength level difference by subtracting the first signal strength level from the second signal strength level; (d) changing a threshold level in accordance with the level crossing rate detected; (e) comparing the signal strength level difference with the threshold and issuing a handoff request in the event that the signal strength level difference is more than the threshold.

A second aspect of the present invention comes in a method of controlling handoff in a cellular mobile radio communications system at a land site, comprising: (a) detecting, at a first land site, a first signal strength level of a channel through which the first land site communicates with a mobile unit, and further detecting, at a second land site, a second signal strength level of a channel through which no communication is established between the second land site and the mobile unit; (b) detecting, at the first land site, a level crossing rate which is the number indicating that the signal strength level crosses a given level within a predetermined time duration; (c) changing, at the first land site, a threshold level in accordance with the level crossing rate detected; (d) allowing the first land site to apply the first signal strength level and the threshold level to a control unit for controlling the first and second land sites, and allowing the second land site to apply the second signal strength level to the control unit; and (e) detecting, at the control unit, a signal strength level difference by subtracting the first signal strength level from the second signal strength level; and (f) comparing, at the control unit, the signal strength level difference with the threshold and issuing a handoff request in the event that the signal strength level difference is more than the threshold.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
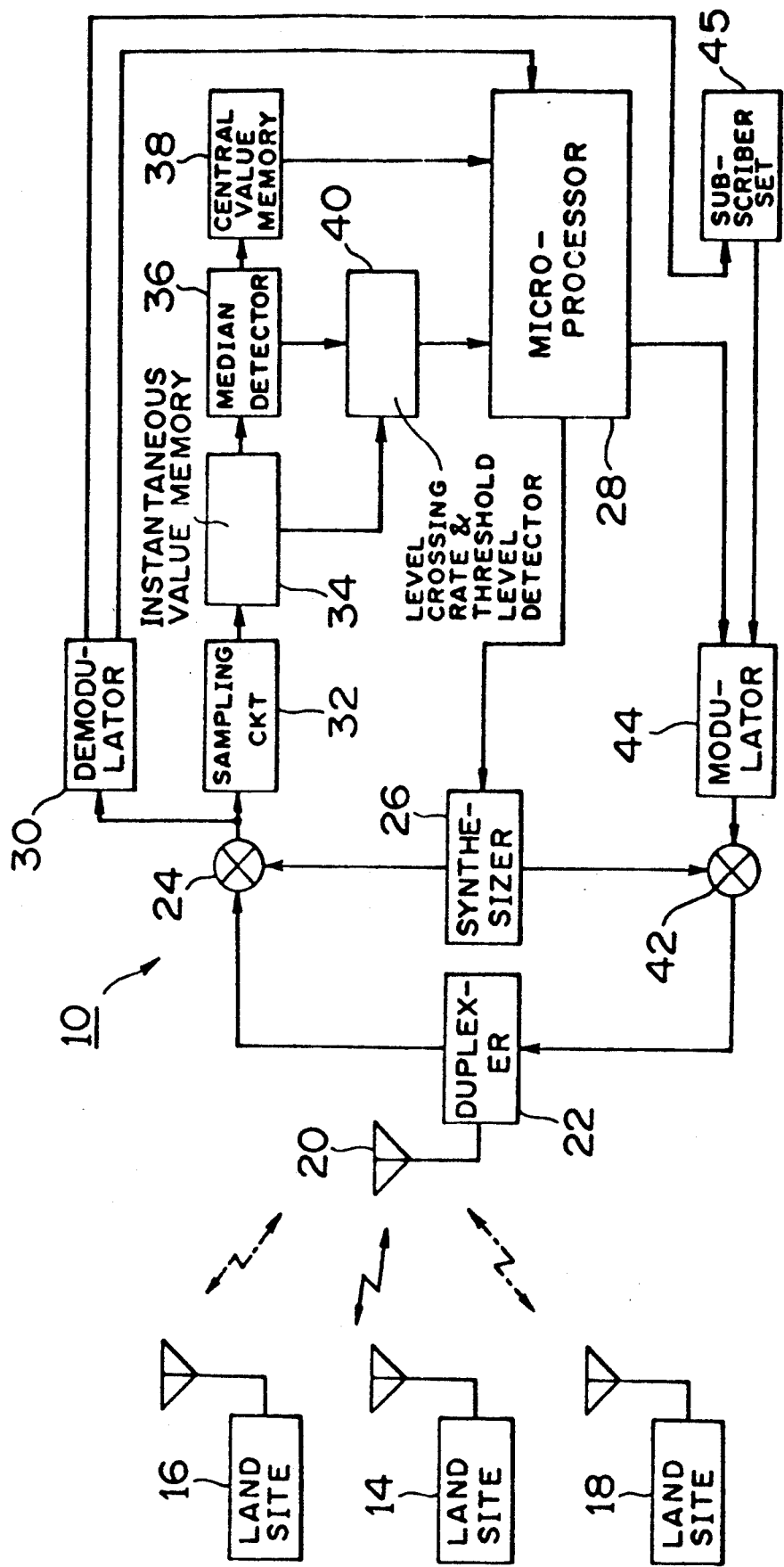
FIG. 1 is a block diagram showing a first embodiment of the present invention.
Figure 2:
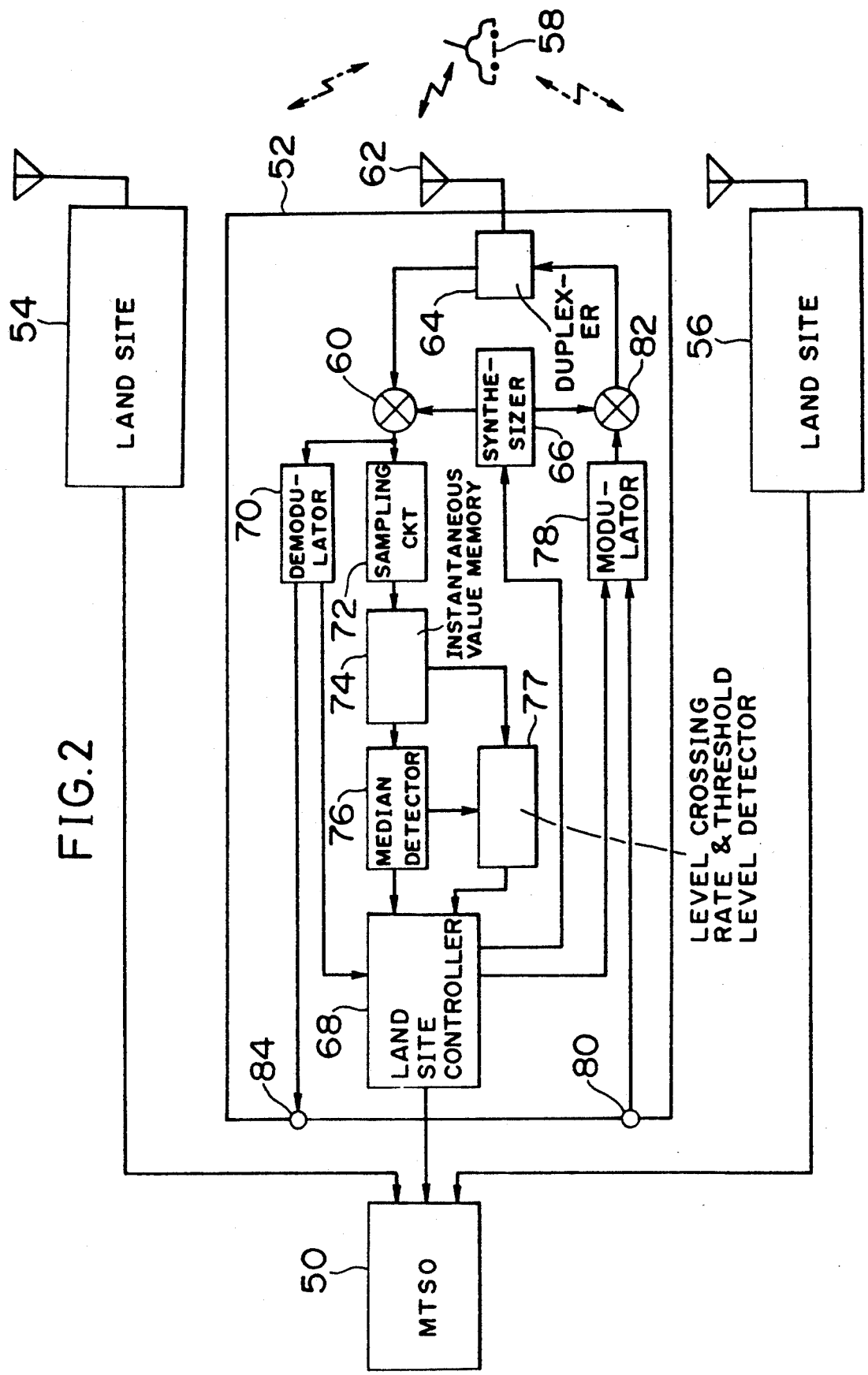
FIG. 2 is a block diagram showing a second embodiment of the present invention.
Figure 3:
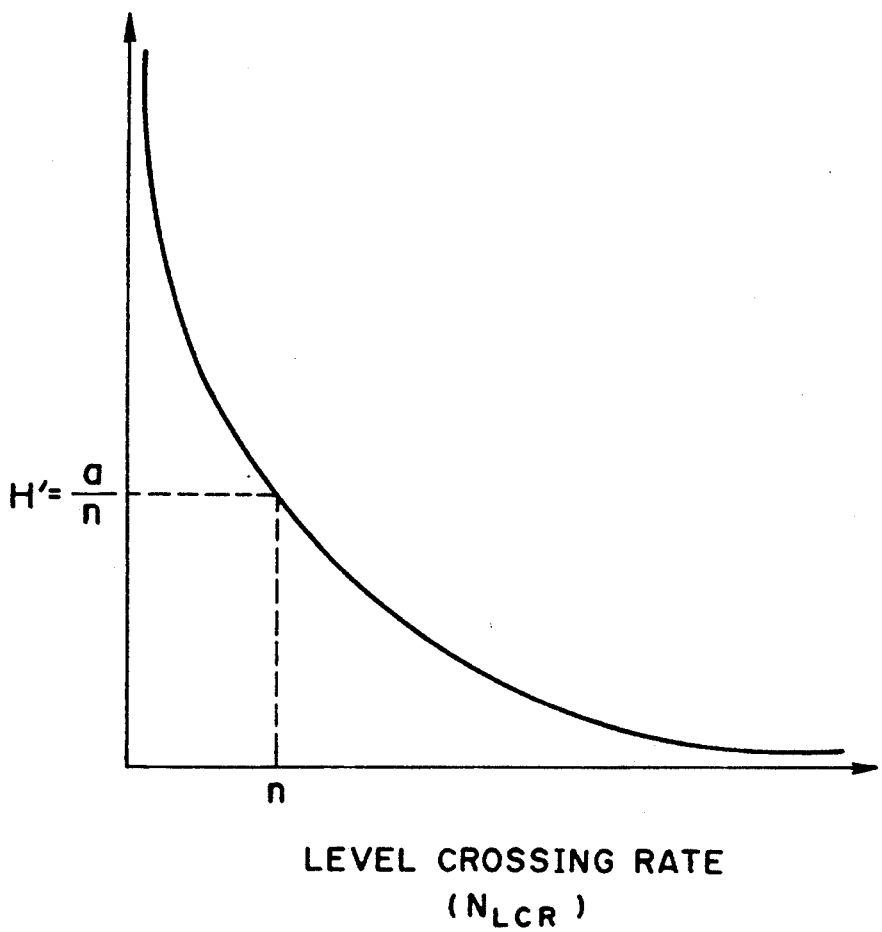
FIG. 3 is a plot for discussing the first and second embodiments.

Before turning to the preferred embodiments shown in FIGS. 1, 2 it is deemed advantageous to briefly discuss the principles underlying the same with reference to FIG. 3.

In the event that a mobile radio communication system encounters multipath fading, it is known in the art that the instantaneous level of a received signal is subject to Rayleigh distribution dependent variation. Such fading is referred to as Rayleigh multipath fading. In the case of Rayleigh fading, the average number of times that an electric field strength crosses a given level R with a positive slope (viz., a level crossing rate ($N_{LCR}$)), is given by the following equation.

$$N_{LCR} = \sqrt{2\pi \ln 2} \cdot f_D \cdot (R/Rm) \cdot \exp\{-\ln 2 \cdot (R/Rm)^2\} \quad (1)$$

wherein $f_D$: maximum doppler frequency; and $Rm$: short-term median of a received signal.

The maximum doppler frequency $f_D$ is represented by $$f_D = V/L \quad (2)$$

wherein
V: travelling speed of mobile terminal; and
L: electric wave length

By substituting equation (2) into equation (1), we obtain $$V = N_{LCR} \cdot L / \sqrt{2\pi \ln 2} \cdot (R/Rm) \cdot \exp\{-\ln 2 \cdot (R/Rm)^2 \quad (3)$$

It is understood from equation (3) that the level crossing rate $N_{LCR}$ is proportional to the mobile terminal travelling speed V. In other words, the travelling speed V is determined by measuring positive or negative slope level crossing rate $N_{LCR}$. In this case, the level R can be chosen arbitrarily. However, the closer the level R to the short-term median of a received signal Rm, the larger the $N_{LCR}$. For this reason, it is preferred to set the level R equal to Rm.

If a threshold level H is determined by $N_{LCR}$ as follows:

$$H = a/N_{LCR} (\text{"a" is an arbitrary constant}) \quad (4)$$

then the threshold level H can be set to a lower level as the travelling speed of a mobile radio terminal increases (indicated in FIG. 3, wherein the plot shows the relationship between the threshold level H and the level crossing rate $N_{LCR}$). More specifically, in FIG. 3, "n" denotes a given value of $N_{LCR}$ and "a/n" a threshold level determined by the constant "a" and the given value "n". The value "a" is empirically determined in terms of transmission quality and the number of handoffs. The level crossing rate is detected at either one of a land site and the mobile terminal. It should be noted that the plotted curve of FIG. 3 varies depending on the constant "a".

By determining when a handoff should be made based on a parameter indicative of the velocity of a mobile radio terminal, the number of handoffs can be reduced to a desired level without lowering transmission quality.

Reference is now made to FIG. 1, wherein a first embodiment of the present invention is shown in block diagram form.

According to the first embodiment, a mobile unit 10 detects the received signal level and the level crossing rate, and issues a handoff request if necessary.

It is assumed that a mobile unit 10 is communicating with a land site 14. It should be noted that the mobile unit 10 detects the signals transmitted from all the lands sites 14, 16 and 18 in this particular case. Merely for the convenience of description, these signals transmitted from the land sites 14-18 and then picked up by a mixer 24, are denoted by reference numerals 14', 16' and 18'. The signals received at an antenna 20 are applied to a receive signal mixer 24 by way of a duplexer 22. The mixer 24 modulates these incoming signals using a frequency controllable signal from a synthesizer 26. That is to say, the signal produced from the synthesizer 26 is controlled in terms of frequency by a microprocessor 28 and thus the received signals 14′, 16′ and 18′ are obtained by the mixer 24. Each of the signals derived from the mixer 24 is applied to a demodulator 30 and a sampling circuit 32.

The sampling circuit 32 is arranged to sample each of the signals applied, via the mixer 24, from the land sites 14, 16 and 18 at a predetermined time interval. The sampled signals are stored in an instantaneous value memory 34. A sampling time interval is set to a sufficiently small value as compared with a fading period and thus fading waveforms are precisely recorded. Following this, a detector 36 is supplied with the instantaneous values of each of the received signals 14′, 16′ and 18′ from the memory 34, and measures each of the received signal strength levels, after which the detector 36 detects a median of each of the received signals from the land sites 14, 16 and 18. The medians thus detected are stored in the next stage, viz., a median memory 38.

Measuring a plurality of the signals received at the antenna 20 can be implemented using a known technique of time division multiplexing, which is disclosed in the above mentioned technical research paper RCS 89-37 (for example) and hence further description of this technique will be omitted for brevity.

A detector 40 is coupled to the blocks 34, 36 and receives the instantaneous value and the medians both relating to the received signal 14′. The detector 40 firstly determines the level crossing rate ($N_{LCR}$). Viz., the detector 40 detects the number which indicates that the positive or negative slope of the instantaneous value of the received signal 14′ crosses the median thereof. Thereafter, the detector 40 ascertains a threshold level T′ from the relationship between the threshold level (T) and the level crossing rate ($N_{LCR}$) as shown in FIG. 3. It is assumed that the detected $N_{LCR}$ is "n" as shown in FIG. 3.

The microprocessor 28 is supplied with the threshold level T′ from the detector 40 and also receives the median of each of the received signals 14′, 16′ and 18′. The microprocessor 28 subtracts the median of the received signal 14′ from each of the medians of the received signals 16′, 18′. In other words, two signal level differences are obtained in this particular case. Following this, the microprocessor 28 compares the threshold level T′ with each of the above-mentioned two signal level differences. In the event that both of the two signal level differences exceed the threshold level T′, the microprocessor 28 decides which is the larger one by way of comparison. Let it be assumed that the difference between the levels of the received signals 14′ and 16′ is larger than that between the levels of the received signals 14′ and 18′. In this case, the microprocessor 28 issues a handoff request indicating a channel switching over to the land site 16, which is applied to a modulator 44.

The mixer 42 mixes the output of the modulator 44 with the output of the synthesizer 26, and produces a signal with a predetermined frequency. A radio signal modulated by the handoff request is applied to the antenna 20 via the duplexer 22 and then is transmitted to the land site 16. The following processes for switching over to a new land site (viz., the land site 16 in this particular case), will not be described in that the present invention is not directly concerned therewith. The present invention may utilize the handoff processes disclosed in the aforesaid technical research paper RCS 89-37 for example.

A subscriber set 45 receives a voice signal from the demodulator 30, while it issues a voice signal to be transmitted which are modulated at the block 44.

Reference is now made to FIG. 2, wherein a second embodiment of the present invention is shown in block diagram form.

According to the second embodiment, a unit for controlling land sites (or MTSO) 50 is supplied with handoff related information from three land sites 52, 54 and 56 in this particular embodiment. In the event that the control unit 50 determines that handoff is necessary, it issues a handoff instruction which is applied to a land site to be "handed off".

It is assumed that a land site 52 is communicating with a mobile unit 58. It should be noted that each of the land sites 52, 54 and 56 detects the signals transmitted from the mobile unit 58. Each of the land sites 52, 54 and 56 is identically configured, the land site 52 only will be discussed.

The signal transmitted via a channel communicating between the land site 52 and the mobile unit 58, is applied to a receive signal mixer 60 by way of an antenna 62 and a duplexer 64. The mixer 60 modulates the incoming signal using a frequency controllable signal from a synthesizer 66. That is to say, the signal produced from the synthesizer 66 is controlled in terms of frequency by a land site controller 68 and thus the signal from the mobile unit 58 is selected. The signal derived from the mixer 60 is applied to a demodulator 70 and a sampling circuit 72.

The sampling circuit 72 is arranged to sample the received signal from the mobile unit 58 at a predetermined time interval. The sampled signals are stored in an instantaneous value memory 74. A sampling time interval is set to a sufficiently small value as compared with a fading period and thus fading waveforms are precisely recorded. Following this, a detector 76 is supplied with the instantaneous values of the received signals stored within the memory 74, and measures an average of the received signal strength level within a predetermine time interval, after which the detector 36 detects a median of the received signal from the mobile unit 58. The medians thus detected are applied to the land site controller 68.

A detector 77 is coupled to the blocks 74, 76 and receives the instantaneous value and the median both relating to the received signal from the mobile unit 58. The detector 77 firstly determines the level crossing rate ($N_{LCR}$). Viz., the detector 77 detects the number which indicates that the positive or negative slope of the instantaneous value of the received signal crosses the median thereof. Thereafter, the detector 77 ascertains a threshold level T′ from the relationship between the threshold level (T) and the level crossing rate ($N_{LCR}$) as shown in FIG. 3. It is assumed that the detected $N_{LCR}$ is "n" as shown in FIG. 3. It should be noted that same reference T′ as referred to in the first embodiment is used in the second one merely for the convenience of description.

The control unit 50 is supplied with the threshold level T′ from the detector 77 and also receives the median of the received signal from the detector 76, both via the land site controller 68.

Each of the other land sites 54, 56 detects a median of a signal which is applied thereto from the mobile unit 58, and then applies the median of the received signal to the control unit 50.

The control unit 50 subtracts the median of the received signal 52' from each of the medians of the received signals 54', 56'. In other words, two signal level differences are obtained in this particular case. Following this, the control unit 50 compares the threshold level T' with each of the above-mentioned two signal level differences. In the event that both of the two signal level differences exceed the threshold level T', the control unit 50 decides which is the larger one by way of comparison. Let it be assumed that the difference between the levels of the received signals 52' and 54' is larger than that between the levels of the received signals 52' and 56'. In this case, the control unit 50 issues a handoff request indicating a channel switching over to the land site 54, which is applied to the land site 56. As an alternative, the handoff request may be applied to a modulator 78 of the land site 54 via an input terminal 80.

A mixer 82 is supplied with a signal modulated by the handoff request and produces a radio signal with a predetermined frequency. This radio signal carrying the handoff request is applied to the antenna 62 via the duplexer 62 and then is transmitted to the mobile unit 58. The following processes for switching over to a new land site (viz., the land site 54 in this particular case), will not be described in that the present invention is not directly concerned therewith.

The voice signal outputted from the demodulator 70 is applied, via an output terminal 84, to the control unit 50 which routes the voice signal to a subsriber's set coupled to a grand telephone network (not shown). On the other hand, a voice signal from the subscriber's set is applied to the modulator 78 via the control unit 50.

In the above-mentioned first and second embodiments, no discussion has not been made in connection with a time period during which the median of the received signal is measured.

According to a research report Vol. 26, No. 7, on page 2058, entitled "The base station transmitter and receiver equipments in the land mobiletelephone system" by Takayosi NAGATSU, published by NTT in 1977, the time period for measuring the median is fixed to 0.8 sec.

However, in the event that the product of the maximum Doppler frequency under Rayleigh fading environment ($f_D$) and the median measuring time period T falls below 20, a standard deviation of a median measuring error becomes more than 1 dB. This is disclosed in detail in a technical report Vol. J64-B, No. 6, on pages 556–557, entitled "Effective sample size and sampling frequency of statistical estimate of average received signal power in a Rayleigh fading signal environment" by Fumiyuki ADACHI, et al, published by Japanese Electronic Communications Association (first manuscript received Oct. 27, 1980 and second manuscript on Jan. 21, 1981).

Accordingly, in the case where the time period T is fixed to 0.8 sec, the above-mentioned standard deviation exceeds 1 dB when the maximum doppler frequency falls below 25 Hz in the case where a vehicle mounted mobile terminal is used during a traffic jam or in the case of a hand-held terminal. On the contrary, when a mobile unit travels at a very high speed, a fading is no longer deemed stationary and hence a high quality transmission is not expected. More specifically, if the median measuring time period is fixed, the median of the receive signal is unable to be correctly measured under Rayleigh fading environment.

According to a third embodiment of the present invention, the median detecting time period T is controlled in accordance with the maximum doppler frequency $f_D$. It is understood from equation (2) that $f_D$ is proportional to V, this means that T is controlled by the mobile unit's travelling speed V.

T is adjusted along with the following equation.

$$T = n/f_D \text{(n: a constant)} \quad (5)$$

More specifically, T is controlled according to $f_D$ wherein "n" is set to about 20.

Figure 4:
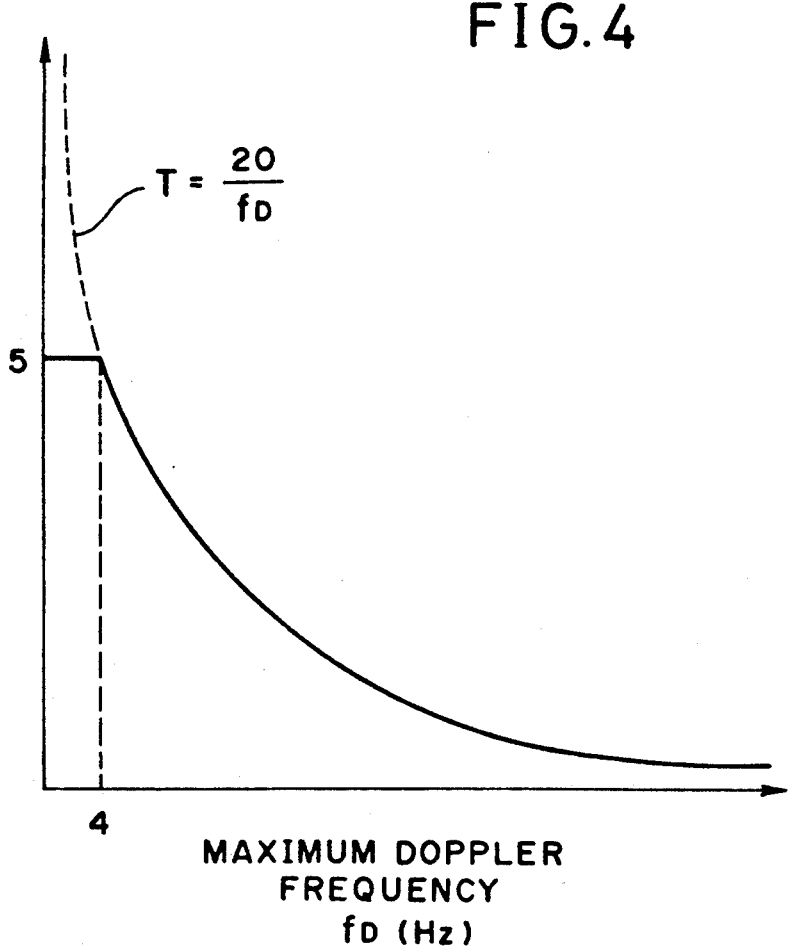
FIG. 4 is a plot for discussing a third preferred embodiment of the present invention.

FIG. 4 illustrates a plotted curve for showing the relationship between the median measuring time period T and the maximum doppler frequency $f_D$ in the case of n=20. T is determined by $f_D$ using the plot shown in FIG. 3. In order to avoid a problem encountered when $f_D$ is reduced to a small value and zero, if $f_D$ falls down below 5 Hz, T is clamped or fixed to 5 seconds (for example).

Thus, the number of unwarranted handoffs can further effectively be reduced by changing the median measuring time period on the basis of a mobile terminal travelling speed.

While the foregoing description described one preferred embodiment with one variant according to the present invention, the various alternatives and modifications possible without departing from the scope of the present invention, which is limited only by the appended claims, will be apparent to those skilled in the art.

What is claimed is:

1. A method of controlling handoff in a cellular mobile radio communications system at a mobile unit, comprising the steps of:
   (a) detecting a first signal strength level of a signal transmitted from a first land site with which said mobile unit communicates, and further detecting a second signal strength level of a signal transmitted from a second land site with which said mobile unit establishes no communication;
   (b) detecting a level crossing rate which is the number indicating that said first signal strength level crosses a predetermined level within a predetermined time duration;
   (c) detecting a signal strength level difference by subtracting said first signal strength level from said second signal strength level;
   (d) changing a threshold level in accordance with the level crossing rate detected; and
   (e) comparing said signal strength level difference with said threshold and issuing a handoff request in the event that said signal strength level difference is more than said threshold.

2. A method as claimed in claim 1, further comprising step of deriving a maximum Doppler frequency from said level crossing rate and said first signal strength level, and wherein said predetermined time duration is changed according to said maximum Doppler frequency.

3. A method of controlling handoff in a cellular mobile radio communications system at a land site comprising the steps of:
   (a) detecting, at a first land site, a first signal strength level of a signal transmitted from a mobile unit with which said first land site communicates, and further detecting, at a second land site, a second signal strength level of a signal transmitted from said mobile unit with which said second land site establishes no communication;

(b) detecting, at said first land site, a level crossing rate which is the number indicating that said first signal strength level crosses a predetermined level within a predetermined time duration;

(c) changing, at said first land site, a threshold level in accordance with the level crossing rate detected;

(d) allowing said first land site to apply said first signal strength level and said threshold level to a control unit for controlling said first and second land sites, and allowing said second land site to apply said second signal strength level to said control unit; and (e) detecting, at said control unit, a signal strength level difference by subtracting said first signal strength level from said second signal strength level; and (f) comparing, at said control unit, said signal strength level difference with said threshold and issuing a handoff request in the event that said signal strength level difference is more than said threshold.

4. A method as claimed in claim 3, further comprising step of deriving a maximum Doppler frequency from said level crossing rate and said first signal strength level, and wherein said predetermined time duration is changed according to said maximum Doppler frequency.

* * * * *